(12) United States Patent
Fukushima (10) Patent No.: US 9,956,914 B2
(45) Date of Patent: May 1, 2018

(54) PARKING ASSISTANCE DEVICE AND PARKING ASSISTANCE METHOD

(71) Applicant: Nissan Motor Co., Ltd., Yokohama-Shi, Kanagawa (JP)

(72) Inventor: Yoshitake Fukushima, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days. days.

(21) Appl. No.: 15/111,259

(22) PCT Filed: Jan. 30, 2014

(86) PCT No.: PCT/JP2014/052128
§ 371 (c)(1),
(2) Date: Jul. 13, 2016

(87) PCT Pub. No.: WO2015/114782
PCT Pub. Date: Aug. 6, 2015

(65) Prior Publication Data
US 2016/0332575 A1 Nov. 17, 2016

(51) Int. Cl.
*H04N 7/18* (2006.01)
*H04N 9/47* (2006.01)
(Continued)

(52) U.S. Cl.
CPC ............ *B60R 1/00* (2013.01); *B60L 11/182* (2013.01); *B60L 11/1803* (2013.01); *B60L 11/1824* (2013.01); *B60L 11/1835* (2013.01); *B60L 11/1861* (2013.01); *G06K 9/00812* (2013.01); *H01F 38/14* (2013.01); *H02J 7/025* (2013.01); *H02J 50/10* (2016.02); *H02J 50/90* (2016.02); *H04N 5/23293* (2013.01); *H04N 7/183* (2013.01); *B60L 2210/30* (2013.01); *B60L 2210/40* (2013.01); *B60L 2250/10* (2013.01); *B60L 2250/16* (2013.01); *B60L 2270/147* (2013.01); *B60R 2300/50* (2013.01); *B60R 2300/806* (2013.01);
(Continued)

(58) Field of Classification Search
None
See application file for complete search history.

(56) References Cited

U.S. PATENT DOCUMENTS 2,074,251 A  3/1937 Braun
6,341,430 B1  1/2002 Carstens et al.
(Continued)

FOREIGN PATENT DOCUMENTS

EP  2184208 A1  5/2010
EP  2202132 A2  6/2010
(Continued)

*Primary Examiner* — Talha M Nawaz
(74) *Attorney, Agent, or Firm* — Young Basile Hanlon & MacFarlane, P.C.

(57) ABSTRACT

In a parking assistance device, a ground mark indicating the coil axis direction and position of a ground coil is placed at a parking space, and a vehicle mark indicating the coil axis direction and position of a vehicle coil is displayed in an image displayed on a display unit. Then, the vehicle mark is displayed in the image in such a way as to be superimposed on the ground mark when the vehicle on which the vehicle coil is mounted reaches a position and angle at which the vehicle can be wirelessly charged.

7 Claims, 7 Drawing Sheets

(51) Int. Cl.
*B60R 1/00* (2006.01)
*H02J 50/10* (2016.01)
*H02J 50/90* (2016.01)
*H02J 7/02* (2016.01)
*B60L 11/18* (2006.01)
*G06K 9/00* (2006.01)
*H01F 38/14* (2006.01)
*H04N 5/232* (2006.01)

(52) U.S. Cl.
CPC ... *B60R 2300/8086* (2013.01); *Y02T 10/7005* (2013.01); *Y02T 10/705* (2013.01); *Y02T 10/7044* (2013.01); *Y02T 10/7072* (2013.01); *Y02T 10/7241* (2013.01); *Y02T 90/12* (2013.01); *Y02T 90/121* (2013.01); *Y02T 90/122* (2013.01); *Y02T 90/125* (2013.01); *Y02T 90/127* (2013.01); *Y02T 90/14* (2013.01)

(56) References Cited

U.S. PATENT DOCUMENTS

| | | | |
|---|---|---|---|
| 7,940,193 | B2 | 5/2011 | Yamanaka |
| 9,379,572 | B2 | 6/2016 | Ichikawa et al. |
| 2008/0158011 | A1 | 7/2008 | Yamanaka |
| 2010/0066515 | A1 | 3/2010 | Shimazaki et al. |
| 2010/0211267 | A1* | 8/2010 | Shimazaki ............... B60R 1/00 701/42 |
| 2011/0285349 | A1 | 11/2011 | Widmer et al. |
| 2012/0095617 | A1 | 4/2012 | Martin |
| 2012/0235636 | A1 | 9/2012 | Partovi |
| 2013/0037339 | A1 | 2/2013 | Hickox |
| 2013/0335015 | A1 | 12/2013 | Ichikawa et al. |
| 2014/0035565 | A1* | 2/2014 | Enthaler ............... G01B 7/14 324/207.17 |
| 2016/0332572 | A1* | 11/2016 | Gibeau ............... B60R 1/00 |

FOREIGN PATENT DOCUMENTS

| | | |
|---|---|---|
| EP | 2556984 A1 | 2/2013 |
| JP | S61193210 A | 8/1986 |
| JP | 2003182489 A | 7/2003 |
| JP | 2008162426 A | 7/2008 |
| JP | 2010195265 A | 9/2010 |
| JP | 2010234878 A | 10/2010 |
| JP | 2011015549 A | 1/2011 |
| JP | 2011182608 A | 9/2011 |
| JP | 2012206691 A | 10/2012 |
| JP | 2013046482 A | 3/2013 |
| JP | 2013192404 A | 9/2013 |
| JP | 2013258881 A | 12/2013 |
| KR | 20090096736 A | 9/2009 |
| WO | 2010098397 A1 | 9/2010 |
| WO | 2013146139 A1 | 10/2013 |

* cited by examiner

PARKING ASSISTANCE DEVICE AND PARKING ASSISTANCE METHOD

TECHNICAL FIELD

The present invention relates to a parking assistance device and a parking assistance method for providing parking assistance in parking a vehicle into a parking space with a ground coil placed at the parking space, the ground coil being configured to wirelessly supply power to a vehicle coil mounted on the vehicle.

BACKGROUND

With the spread of electric vehicles and plug-in hybrid vehicles in recent years, wireless charge systems have been developed which are configured to wirelessly supply power to a vehicle coil mounted on a vehicle. Here, such wireless charge systems require high parking accuracy in order to improve the efficiency of charge between a vehicle coil and a ground coil.

In view of this, a parking assistance system disclosed in Japanese Patent Application No. 2011-15549 detects the distance between a ground coil and a vehicle coil by supplying lower power than normally supplied power from the ground coil to the vehicle coil after the ground coil gets under the vehicle body and the ground coil can no longer be imaged by a camera. The parking assistance system then displays a mark indicating the vehicle coil and a mark indicating the ground coil on a display unit and reflects the detected distance between the coils on the distance between the marks to thereby provide assistance for accurate parking of the vehicle.

However, the conventional parking assistance system mentioned above merely detects the distance between the ground coil and the vehicle coil, and therefore has a problem in that the positions of the ground coil and the vehicle coil can be aligned with each other but their angles cannot be aligned with each other. In particular, in a case of using solenoid type coils as the ground coil and the vehicle coil, a difference in angle therebetween drastically lowers the charge efficiency. Hence, a different in angle between the ground coil and the vehicle coil has been a problem.

SUMMARY

The present invention has thus been proposed in view of the circumstances mentioned above, and an object thereof is to provide a parking assistance device and a parking assistance method capable of accurately aligning not only the positions but also the angles of a ground coil and a vehicle coil with each other.

To solve the above problem, in a parking assistance device according to one aspect of the present invention, a ground mark indicating the coil axis direction and position of a ground coil is placed at a parking space, and a vehicle mark indicating the coil axis direction and position of a vehicle coil is superimposed and displayed on an image displayed on a display unit. Then, the parking assistance device displays the vehicle mark on the image such that the vehicle mark is superimposed on the ground mark when the vehicle on which the vehicle coil is mounted reaches a position and angle at which the vehicle can be wirelessly charged.

DETAILED DESCRIPTION OF THE EMBODIMENTS

First and second embodiments to which the present invention is applied will be described below with reference to the drawings.

Figure 1:
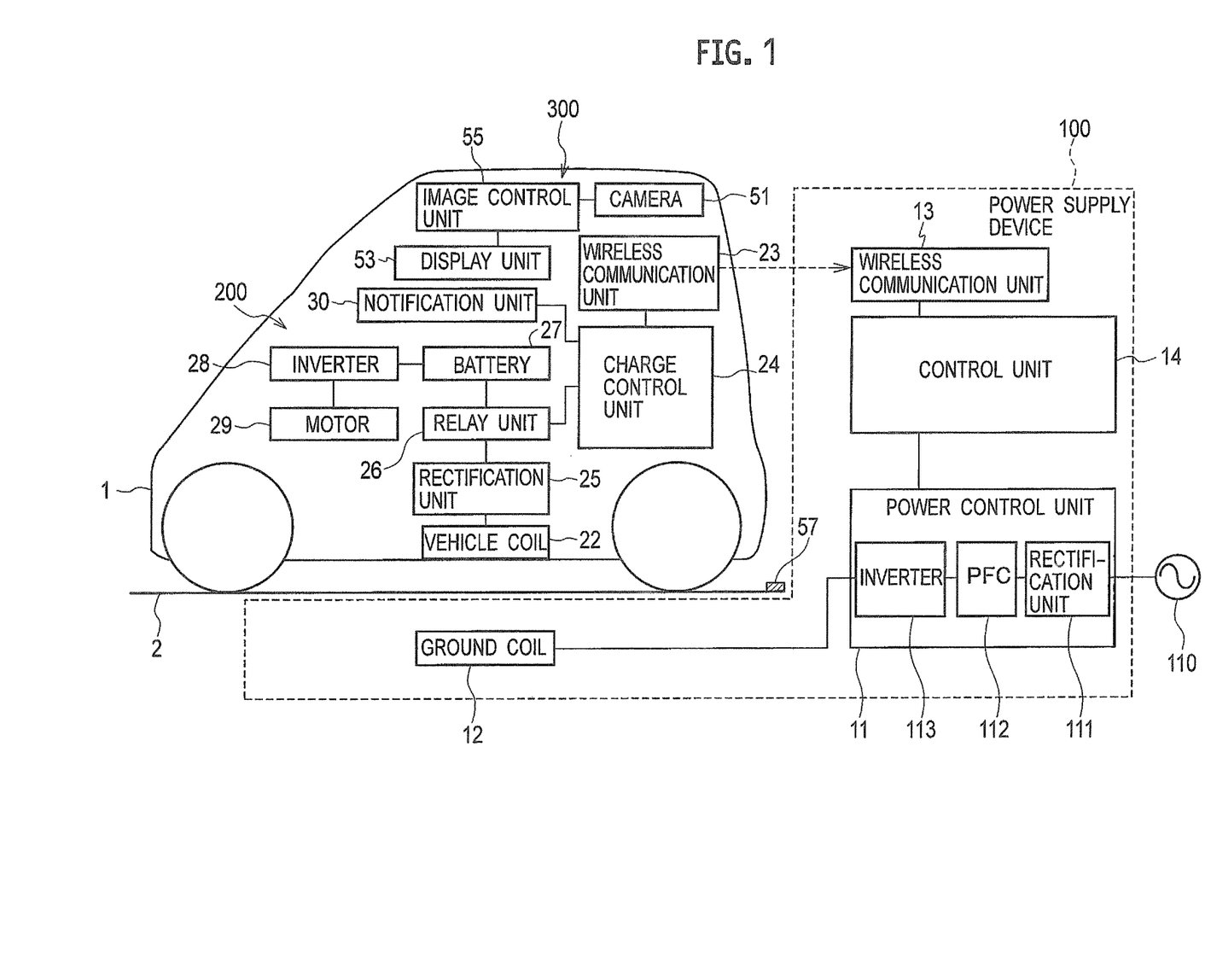
FIG. 1 is a block diagram showing the configuration of a wireless charge system including a parking assistance device according to a first embodiment of the present invention.

FIG. 1 is a block diagram showing the configuration of a wireless power supply system including a parking assistance device according to this embodiment. As shown in FIG. 1, the wireless power supply system includes a power supply device 100 being a ground-side unit, a power reception device 200 being vehicle-side units, and a parking assistance device 300. This wireless power supply system is configured to charge a battery mounted on a vehicle 1 such as an electric vehicle or a hybrid vehicle by wirelessly supplying power from the power supply device 100, which is disposed at a power supply stand or the like, to the power reception device 200, which is mounted on the vehicle 1.

The power supply device 100 includes a ground coil 12 disposed at a parking space 2 near the power supply station. On the other hand, the power reception device 200 includes a vehicle coil 22 placed at the bottom of the vehicle 1. This vehicle coil 22 is disposed to face the ground coil 12 when the vehicle 1 stops at a predetermined position in the parking space 2.

The ground coil 12 is formed as a primary coil made of a conductive line, and functions as a power transmission coil configured to transmit power to the vehicle coil 22, while the vehicle coil 22 is formed as a secondary coil also made of a conductive line, and functions as a power reception coil configured to receive power from the ground coil 12. Power can be wirelessly supplied from the ground coil 12 to the vehicle coil 22 by electromagnetic induction effect between the two coils.

The power supply device 100 on the ground side includes a power control unit 11, the ground coil 12, a wireless communication unit 13, and a control unit 14.

The power control unit 11 is a circuit configured to convert AC power transmitted from an AC power source 110 into high-frequency AC power and transmit it to the ground coil 12. Moreover, the power control unit 11 includes a rectification unit 111, a PFC circuit 112, and an inverter 113.

The rectification unit 111 is a circuit electrically connected to the AC power source 110 and configured to rectify the AC power outputted from the AC power source 110. The PFC (Power Factor Correction) circuit 112 is a circuit configured to improve power factor by changing the waveform outputted from the rectification unit 111 into a favorable waveform, and is connected between the rectification unit 111 and the inverter 113. The inverter 113 includes a PWM (Power Width Modulation) control circuit constructed of switching element such as IGBTs, and is configured to convert the DC power into AC power based on switching control signals and supply the AC power to the ground coil 12.

The wireless communication unit 13 is configured to perform bidirectional communication with a wireless communication unit 23 provided to the vehicle 1 side.

The control unit 14 is a part configured to control the whole power supply device 100. In particular, the control unit 14 controls the communication between the wireless communication units 13, 23. For example, the control unit 14 transmits to the vehicle 1 side a signal indicating start of supply of power from the power supply device 100, and receives from the vehicle 1 side a signal requesting supply of power from the power supply device 100. Besides the above, the control unit 14 controls the switching of the inverter 113 and controls the power to be transmitted from the ground coil 12.

On the other hand, the power reception device 200 on the vehicle 1 side includes the vehicle coil 22, the wireless communication unit 23, a charge control unit 24, a rectification unit 25, a relay unit 26, a battery 27, an inverter 28, a motor 29, and a notification unit 30.

The vehicle coil 22 is disposed at such a position as to face the ground coil 12 from immediately above it with a predetermined value of distance to the ground coil 12 when the vehicle 1 is parked at a predetermined stop position in the parking space 2.

The wireless communication unit 23 is configured to perform bidirectional communication with the wireless communication unit 13, which is provided to the power supply device 100.

The charge control unit 24 is a controller for controlling the charge of the battery 27, and is configured to control components such as the wireless communication unit 23, the notification unit 30, and the relay unit 26. The charge control unit 24 transmits a signal indicating start of charge to the control unit 14 through communication between the wireless communication units 13, 23.

The rectification unit 25 is connected to the vehicle coil 22, and is constructed of a rectification circuit configured to rectify the AC power received by the vehicle coil 22 into DC power.

The relay unit 26 includes a relay switch capable of being switched on and off under control of the charge control unit 24. Moreover, by switching off the relay switch, the relay unit 26 separates a main circuit system, which includes the battery 27, and the vehicle coil 22 and the rectification unit 25, which function as a charge circuit section, from each other.

The battery 27 is formed by connecting a plurality of secondary batteries and functions as a power source for the vehicle 1.

The inverter 28 includes a PWM control circuit constructed of switching elements such as IGBTs, and is configured to convert DC power outputted from the battery 27 into AC power based on switching control signals and supply the AC power to the motor 29.

The motor 29 is constructed of a three-phase AC motor, for example, and functions as a drive source for driving the vehicle 1.

The notification unit 30 is constructed of an alarm lamp, the display of a navigation system, a speaker, or the like, and is configured to output light, an image, a sound, or the like to the user based on control of the charge control unit 24.

With this configuration, the wireless power supply system wirelessly transmits and receives high-frequency power through electromagnetic induction effect between the ground coil 12 and the vehicle coil 22. Specifically, by applying voltage to the ground coil 12, the ground coil 12 and the vehicle coil 22 are magnetically coupled to each other, so that power is supplied from the ground coil 12 to the vehicle coil 22.

Next, the configuration of the parking assistance device 300 according to this embodiment will be described with reference to FIG. 1. The parking assistance device 300 provides parking assistance in parking the vehicle 1 into the parking space 2. The parking assistance device 300 provides the parking assistance such that not only the positions but also the angles of the ground coil 12 and the vehicle coil 22 are aligned with each other. Here, the parking assistance device 300 includes a camera 51, a display unit 53, and an image control unit 55. Also, a ground mark 57 is placed at the parking space 2. This ground mark 57 indicates the coil axis direction of the ground coil 12 and the position of the ground coil 12. The shape of the ground mark 57 will be described later in detail.

The camera 51 is an example of an imaging unit configured to capture an image of the parking space 2 including the ground mark 57, and its height and direction have been adjusted such that it can image the ground surface. Note that this embodiment will be described by exemplarily presenting a case where the camera 51 is a back camera, but the camera 51 may be a front camera on the assumption of performing head-in parking.

The display unit 53 is a display configured to present an image to the driver. The display unit 53 displays an image captured by the camera 51. Note that the display unit 53 may be the display of a navigation system.

The image control unit 55 is configured to control the image displayed on the display unit 53 during parking assistance and displays a vehicle mark in the image displayed on the display unit 53. This vehicle mark is an indication mark indicating the coil axis direction of the vehicle coil 22 and the position of the vehicle coil 22. Moreover, the image control unit 55 is configured to display the vehicle mark in the image on the display unit 53 such that the vehicle mark and the ground mark 57 are superimposed on each other when the vehicle 1, on which the vehicle coil 22 is mounted, reaches a position and angle at which the vehicle 1 can be wirelessly charged. Alternatively, the image control unit 55 may be configured to display the vehicle mark in the image on the display unit 53 such that the vehicle mark and the ground mark 57 are superimposed on each other when the vehicle 1 reaches a position and angle at which the wireless charge is at the maximum charge efficiency.

Note that the parking assistance device 300 is constructed of general-purpose electronic circuits including a microcomputer, a microprocessor or a CPU, and peripheral instruments, and operates as the image control unit 55 by executing a particular program.

Figure 2:
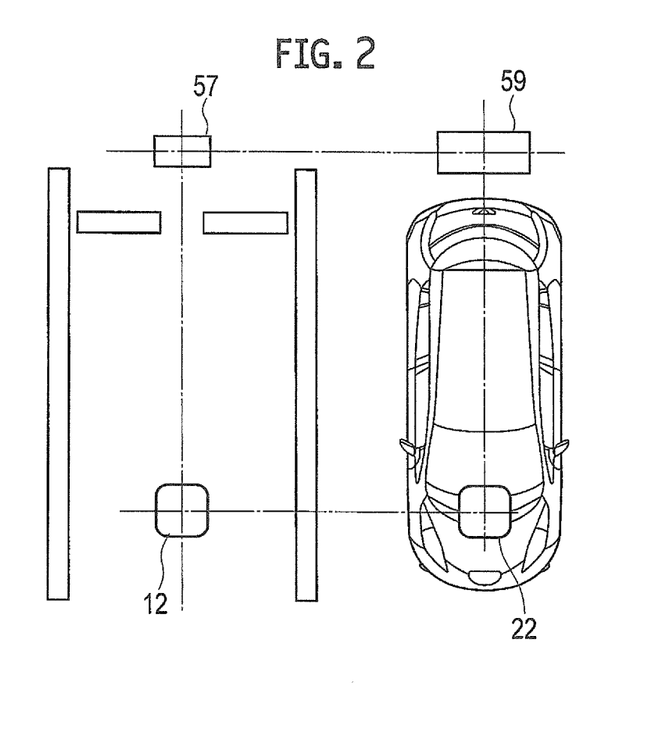
FIG. 2 is a diagram for explaining the arrangement of a ground mark and a vehicle mark for the parking assistance device according to the first embodiment of the present invention.

Next, the arrangement of the ground mark 57 and the vehicle mark will be described with reference to FIG. 2. As shown in FIG. 2, the ground mark 57 is placed at the back of the parking space 2. This position is a position on the center line of the ground coil 12 and is also a position from which the ground mark 57 can be imaged by the camera 51 when the vehicle 1 is parked at a position at which the vehicle 1 can be wirelessly charged.

On the other hand, a vehicle mark 59 is present at a position on the center line of the vehicle coil 22 on the image displayed on the display unit 53, and is displayed at such a position as to be superimposed on the ground mark 57 when the vehicle 1 reaches a position and angle at which the vehicle 1 can be wirelessly charged.

Figure 3:
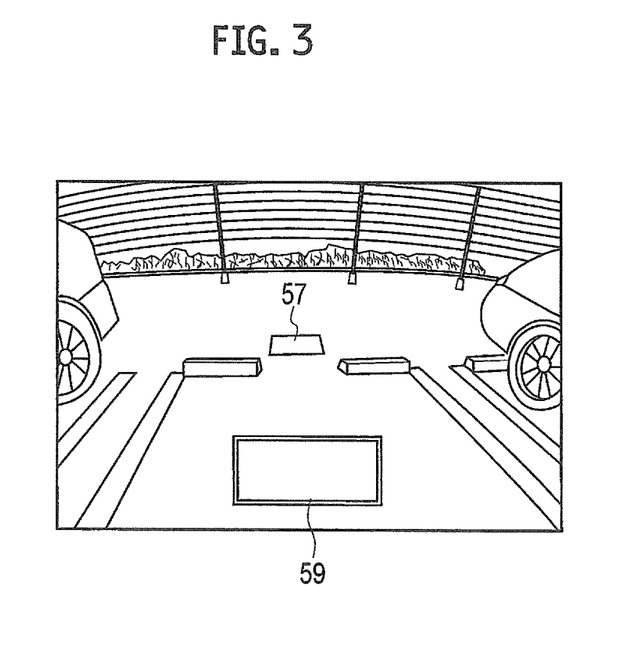
FIG. 3 is a diagram showing an image displayed on a display unit during parking assistance by the parking assistance device according to the first embodiment of the present invention.
Figure 4:
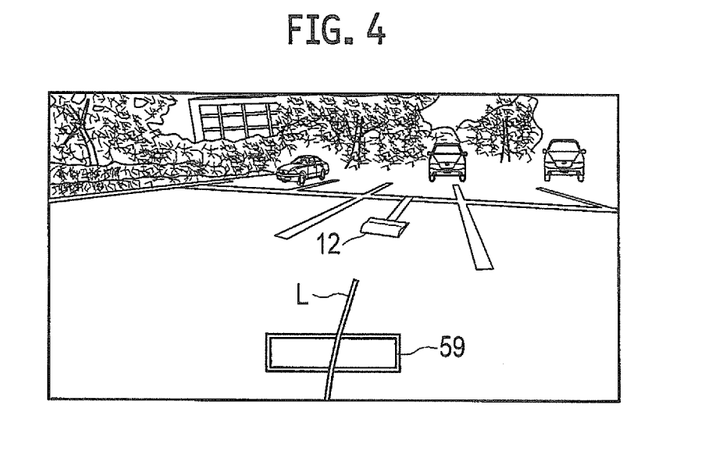
FIG. 4 is a diagram showing the image displayed on the display unit during the parking assistance by the parking assistance device according to the first embodiment of the present invention.

Thus, seeing an image on the display unit 53 as shown in FIG. 3, the driver parks the vehicle 1 such that the ground mark 57 and the vehicle mark 59 will be superimposed on each other. In doing so, the image control unit 55 displays a track prediction line L predicting the track of the vehicle mark 59 on the image of the display unit 53 as shown in FIG. 4, and changes the track prediction line L in accordance with change in steering angle of the vehicle 1 by acquiring the steering angle from the steering angle sensor of the vehicle 1.

Also, the image control unit 55 may detect change in coil-to-coil distance between the ground coil 12 and the vehicle coil 22 from change in attitude of the vehicle 1, and correct the position and shape of the vehicle mark 59 in accordance with the change in coil-to-coil distance. In this case, the image control unit 55 acquires a value detected by a pneumatic sensor, a stroke sensor, a height sensor, or the like mounted on the vehicle 1, and determines whether or not the number of occupants and/or the loaded state has changed the attitude of the vehicle 1 and accordingly changed the coil-to-coil distance. If the coil-to-coil distance has been changed, the image control unit 55 corrects the position and shape of the vehicle mark 59 in accordance with the change in coil-to-coil distance. For example, a criterial suspension stroke is stored in the image control unit 55 in advance and, upon change in suspension stroke caused by sinking of the vehicle by an item(s) or an occupant(s), the image control unit 55 estimates the change in coil-to-coil distance from the change in suspension stroke. Then, the image control unit 55 corrects the position and size of the vehicle mark 59 by changing the position and the size of the vehicle mark 59 in accordance with the change in coil-to-coil distance.

Figure 5:
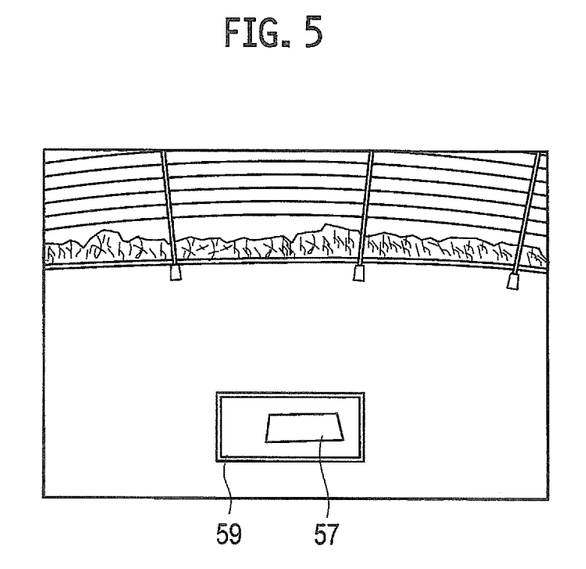
FIG. 5 is a diagram showing the image displayed on the display unit during the parking assistance by the parking assistance device according to the first embodiment of the present invention.

By parking the vehicle 1 in such a way as to finally superimpose the ground mark 57 and the vehicle mark 59 on each other as shown in FIG. 5 with the parking assistance by means of the image control as described above, the driver can park the vehicle 1 at a position and angle at which the vehicle 1 can be wirelessly charged. Also, by parking the vehicle 1 in such a way as to superimpose the ground mark 57 and the vehicle mark 59 on each other, the driver can park the vehicle 1 at a position and angle at which the wireless charge is at the maximum charge efficiency.

Figures 6A, 6B:
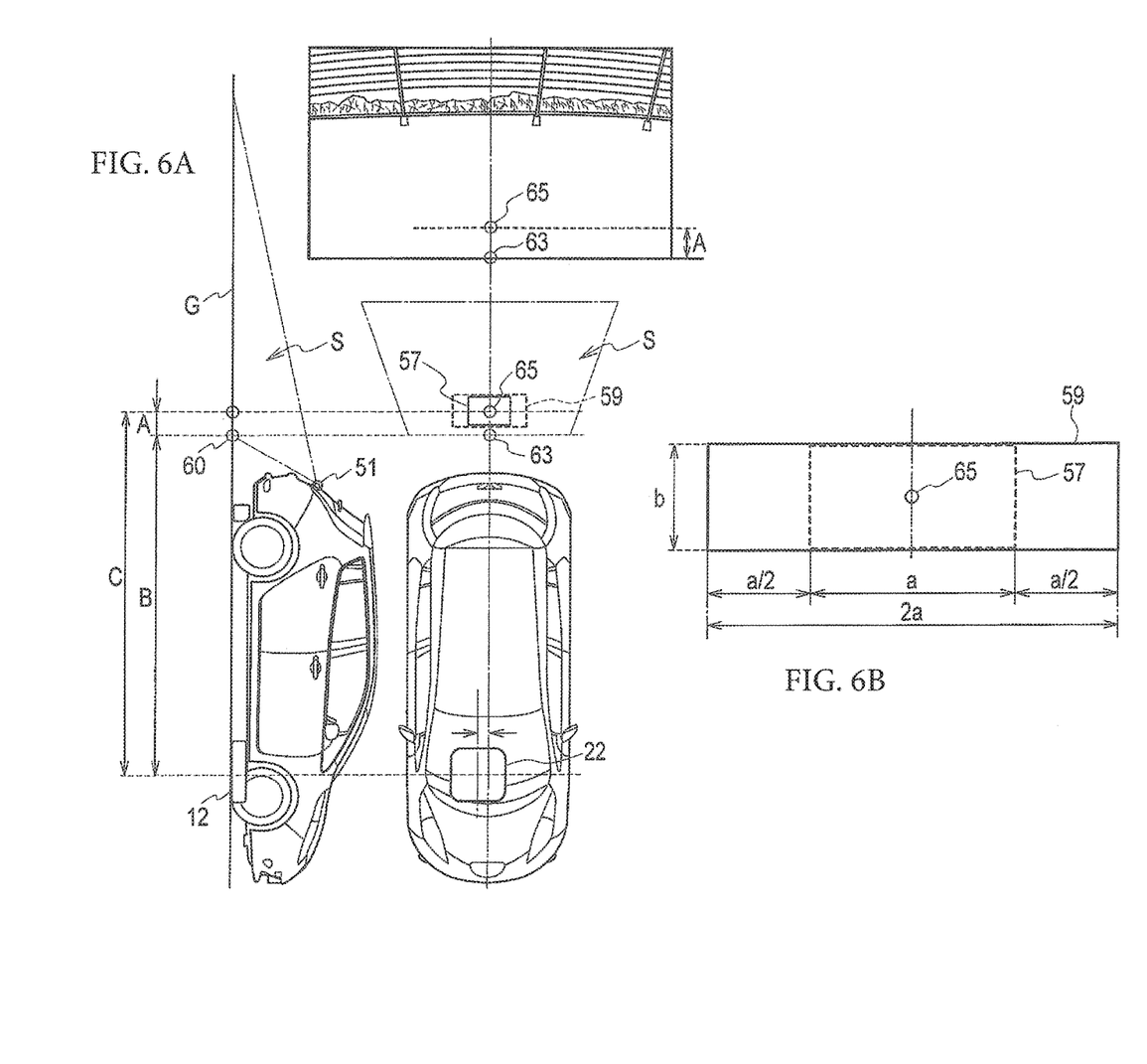
FIGS. 6A and 6B are diagrams explaining the arrangement and shapes of the ground mark and the vehicle mark for the parking assistance device according to the first embodiment of the present invention.

Next, detailed arrangement and shapes of the ground mark 57 and the vehicle mark 59 will be described with reference to FIGS. 6A and 6B. As shown in FIG. 6A, a point 60 at which a field of view S of the camera 51 crosses a ground surface G is the bottom edge of the angle of view of the camera 51 and is the bottom edge of the displayed image. A point at which the bottom edge of this angle of view and the center line of the vehicle 1 cross each other is a first origin 63, and a point on the center line of the vehicle 1 at a predetermined distance A from this first origin 63 is a second origin 65. Note that, in a case where the center of the vehicle 1 and the center of the vehicle coil 22 are offset from each other, the positions of the first and second origins 63, 65 are corrected in accordance with the position of the vehicle coil 22.

Then, as shown in FIG. 6B, the ground mark 57, which has a line segment shape centered at the second origin 65 and having a length of a in the vehicle width direction of the vehicle 1 and a width of b in the front-rear direction of the vehicle 1, is placed at the parking space 2. The length a may be equal to 200 mm, and the width b may be equal to 100 mm, for example.

On the other hand, the vehicle mark 59 has a line segment shape centered at the second origin 65 and having a length of 2a in the vehicle width direction of the vehicle 1 and a width of b in the front-rear direction of the vehicle 1 as shown in FIG. 6B, and this line segment shape is displayed with its size converted into a size on the image. In a case where the length a=200 mm and the width b=100 mm, for example, the shape of the vehicle mark 59 has a length of 400 mm in the vehicle width direction of the vehicle 1 and a width of 100 mm in the front-rear direction of the vehicle 1. Note that the vehicle mark 59 is longer than the ground mark 57 in FIGS. 6A and 6B, but the ground mark 57 may be longer.

Figure 7:
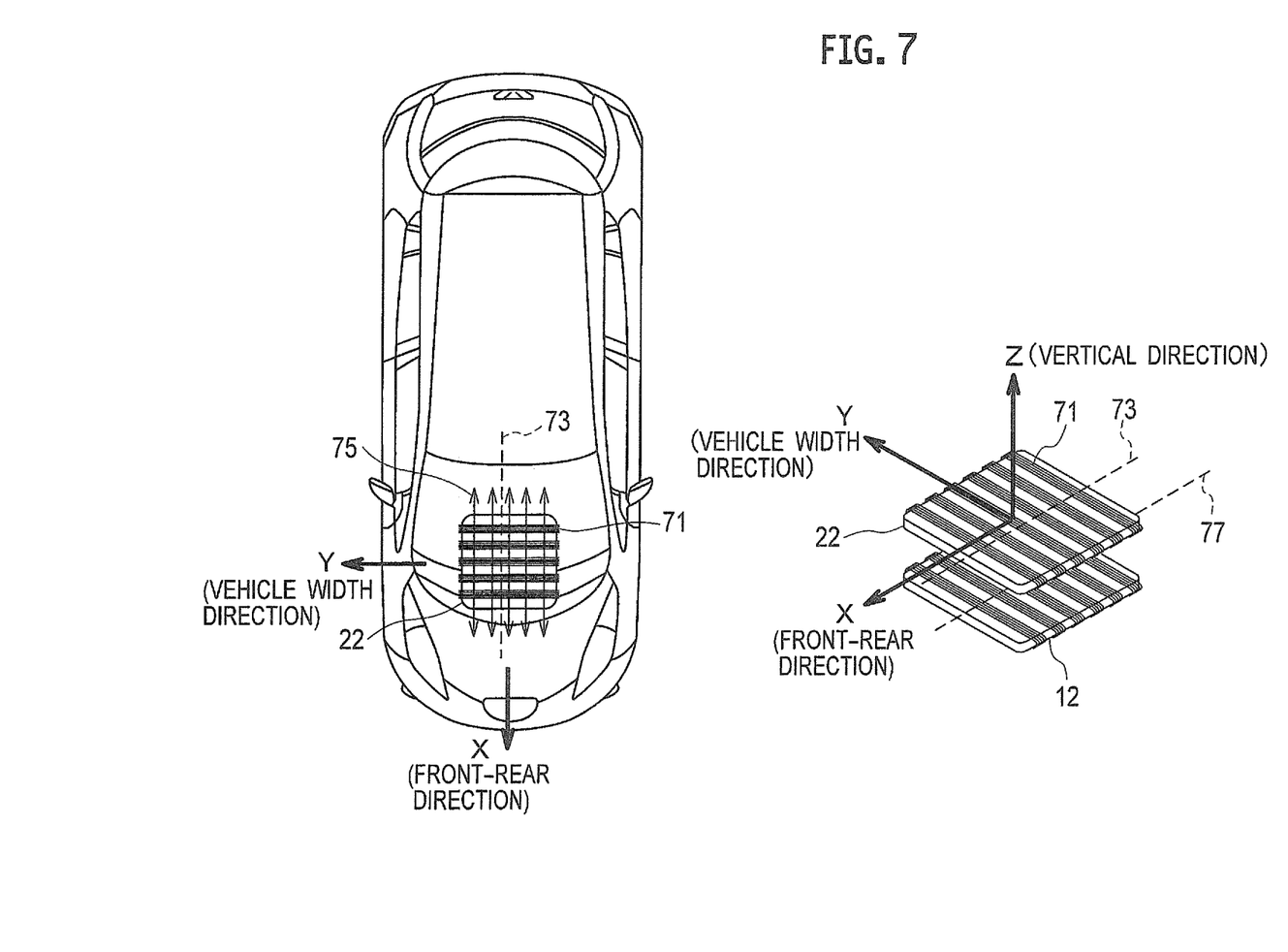
FIG. 7 is a diagram for explaining a manner in which solenoid type coils are arranged in a case of using the solenoid type coils as the ground coil and the vehicle coil of the wireless charge system.

Here, the line segment shape of the vehicle mark 59 indicates the direction of the coil axis of the vehicle coil 22. For example, as shown in FIG. 7, in a case where the vehicle coil 22 is a solenoid type coil and a litz wire 71 is disposed along the vehicle width direction, a coil axis 73 of the vehicle coil 22 is oriented in the front-rear direction of the vehicle, and a magnetic flux 75 is generated in the front-rear direction of the vehicle as well. Then, in this case, the line segment shape of the vehicle mark 59 is displayed long in a direction perpendicular to the coil axis 73 and thus indicates the direction of the coil axis 73. On the other hand, in a case where the vehicle coil 22 is disposed with the litz wire 71 along the front-rear direction of the vehicle, the coil axis 73 is oriented in the vehicle width direction. In this case, the line segment shape of the vehicle mark 59 is displayed long in the direction parallel to the coil axis 73 and indicates the direction of the coil axis 73.

Similarly, as shown in FIG. 7, the line segment shape of the ground mark 57 is placed in such a way as to indicate the direction of a coil axis 77 of the ground coil 12. Specifically, in a case where the litz wire of the ground coil 12 is disposed along the vehicle width direction, the line segment shape of the ground mark 57 is displayed long in a direction perpendicular to the coil axis 77 and thus indicates the direction of the coil axis 77. On the other hand, in a case where with the litz wire of the ground coil 12 is disposed along the front-rear direction of the vehicle, the line segment shape of the ground mark 57 is displayed long in the direction parallel to the coil axis 77 and indicates the direction of the coil axis 77.

With the line segment shapes of the ground mark 57 and the vehicle mark 59 are set as described above, the driver can bring the direction of the coil axis of the ground coil 12 and the direction of the coil axis of the vehicle coil 22 into coincidence with each other by superimposing the ground mark 57 and the vehicle mark 59 on each other on the image. As a result, the magnetic flux generated from the ground coil 12 penetrates the vehicle coil 22 in the direction of its coil axis. Hence, the efficiency of charge from the ground coil 12 to the vehicle coil 22 can be improved.

Also, the ground mark 57 and the vehicle mark 59 indicate the positions of the ground coil 12 and the vehicle coil 22, respectively. As shown in FIGS. 6A and 6B, the ground mark 57 is placed at a distance of A+B=C from the ground coil 12, and the vehicle mark 59 is displayed also at a distance of C from the vehicle coil 22. Thus, the ground mark 57 and the vehicle mark 59 indicate positions from the ground coil 12 and the vehicle coil 22, respectively. Further, since the ground mark 57 and the vehicle mark 59 are located on the center lines of the ground coil 12 and the vehicle coil 22, respectively, as shown in FIG. 2, the ground mark 57 and the vehicle mark 59 indicate positions in the vehicle width direction.

Then, by superimposing the ground mark 57 and the vehicle mark 59 on each other on the image, the driver can accurately align the angles and also positions of the ground coil 12 and the vehicle coil 22 with each other.

Figure 8A:
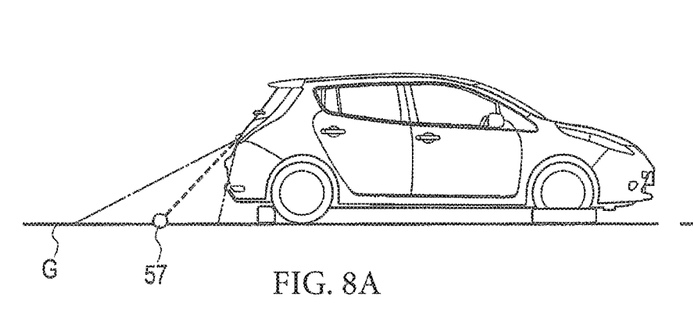
FIGS. 8A-8D are diagrams explaining locations to place the ground mark for the parking assistance device according to the first embodiment of the present invention.
Figure 8B:
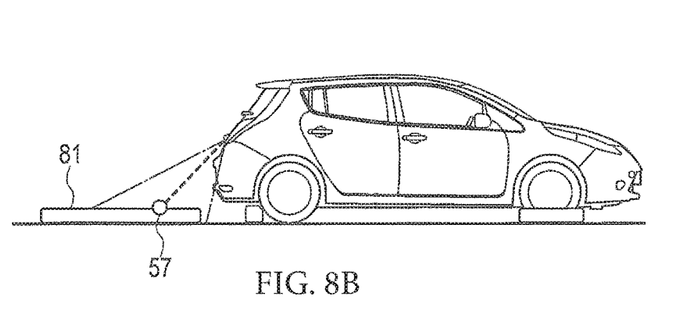
Figure 8C:
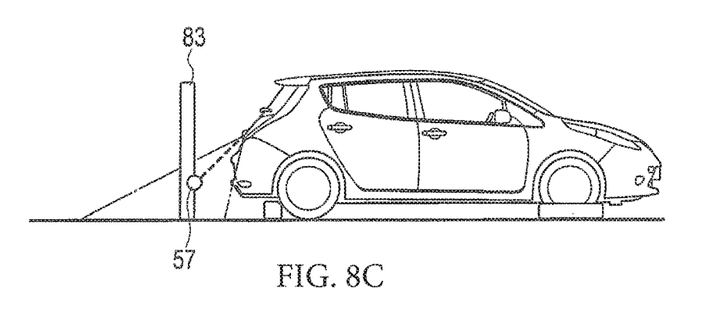
Figure 8D:
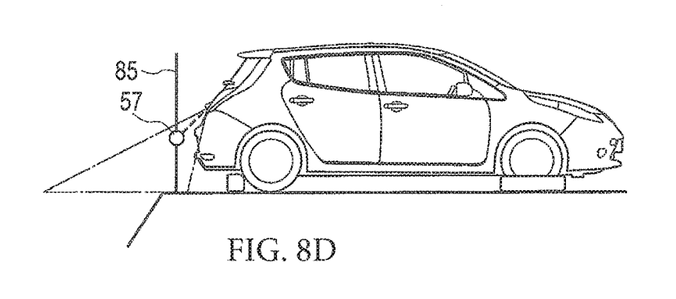

Note that the location to place the ground mark 57 is not limited to the ground surface G of the parking space 2 shown in FIG. 8A. As shown in FIG. 8B, the ground mark 57 may be on a sidewalk 81. Alternatively, as shown in FIG. 8C, the ground mark 57 may be placed on a wall or pole 83 provided at the parking space 2, or the ground mark 57 may be placed on a fence 85 shown in FIG. 8D.

As described above in detail, in the parking assistance device 300 according to this embodiment, the ground mark 57, indicating the coil axis direction and position of the ground coil 12, is placed at the parking space 2, and the vehicle mark 59, indicating the coil axis direction and position of the vehicle coil 22, is displayed on the image on the display unit 53. The parking assistance device 300 then displays the image such that the vehicle mark 59 is superimposed on the ground mark 57 when the vehicle reaches a position and angle at which the vehicle can be wirelessly charged. Thus, the driver can accurately align not only the positions but also the angles of the ground coil 12 and vehicle coil 22 with each other by parking in such a way as to superimpose the ground mark 57 and the vehicle mark 59 on each other on the image displayed on the display unit 53.

Also, in the parking assistance device 300 according to this embodiment, solenoid type coils are used as the ground coil 12 and the vehicle coil 22. The ground mark 57 has the shape of a line segment indicating the coil axis direction of the ground coil 12. Moreover, the vehicle mark 59 has the shape of a line segment indicating the coil axis direction of the vehicle coil 22. Thus, in the case of using solenoid type coils, which require accurate angular alignment, not only the positions but also the angles of the ground coil 12 and the vehicle coil 22 can be accurately aligned with each other by using the simple line segment shapes.

Further, in the parking assistance device 300 according to this embodiment, change in coil-to-coil distance between the ground coil 12 and the vehicle coil 22 is detected from change in attitude of the vehicle 1, and the position and shape of the vehicle mark 59 are corrected in accordance with the change in coil-to-coil distance. Thus, even in a case where an occupant(s) and/or a loaded item(s) changes the attitude of the vehicle 1, the positions and angles of the ground coil 12 and the vehicle coil 22 can be accurately aligned with each other.

Moreover, in the parking assistance device 300 according to this embodiment, the track prediction line L, predicting the track of the vehicle mark 59, is displayed on the image, and the track prediction line L is changed in accordance with the steering angle of the vehicle 1. Thus, the driver can easily perform parking operation for aligning the positions and angles of the ground coil 12 and the vehicle coil 22 with each other.

Next, a parking assistance device according to a second embodiment of the present invention will be described with reference to a drawing. Note that the configurations of a wireless power supply system and the parking assistance device in this embodiment are the same as those in the first embodiment, and detailed description will therefore be omitted.

The parking assistance device 300 according to this embodiment differs from that in the first embodiment in the shape of the vehicle mark. In the first embodiment, the vehicle mark has the shape of a line segment indicating the direction of the coil axis of the vehicle coil 22. In this embodiment, in addition to the shape of a line segment indicating the direction of the coil axis of the vehicle coil 22, the vehicle mark has a width corresponding to a range within which a predetermined charge efficiency can be achieved.

Figure 9:
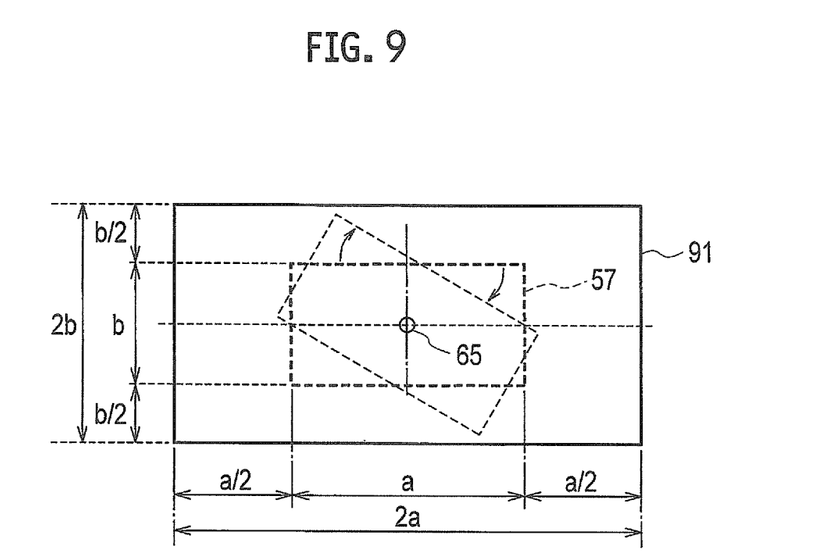
FIG. 9 is a diagram for explaining the shapes of a ground mark and a vehicle mark for a parking assistance device according to a second embodiment of the present invention.

Specifically, as shown in FIG. 9, the ground mark 57 has a line segment shape centered at the second origin 65 and having a length of a in the vehicle width direction of the vehicle 1 and a width of b in the front-rear direction of the vehicle 1, as in the first embodiment. The length a is equal to 200 mm, and the width b is equal to 100 mm, for example.

On the other hand, as shown in FIG. 9, a vehicle mark 91 has a line segment shape centered at the second origin 65 and having a length of 2a in the vehicle width direction of the vehicle 1 and a width of 2b in the front-rear direction of the vehicle 1, and this line segment shape is displayed with its size converted into a size on the image. In a case where the length a=200 mm and the width b=100 mm, for example, the shape of the vehicle mark 91 has a length of 400 mm in the vehicle width direction of the vehicle 1 and a width of 200 mm in the front-rear direction of the vehicle 1.

Thus, in FIG. 9, as compared to the ground mark 57, the width of the vehicle mark 91 is widened by b/2 to the front and to the rear and hence widened by b in total. This width of b by which the vehicle mark 91 is widened corresponds to the range within which the predetermined charge efficiency can be achieved.

Here, in a case of employing solenoid type coils as the ground coil 12 and the vehicle coil 22, the required predetermined charge efficiency is set in advance. In order to achieve this charge efficiency, the angle formed between the ground coil 12 and the vehicle coil 22 needs to be at or below a predetermined value.

For this reason, as shown in FIG. 9, the ground mark 57 is turned by the predetermined angle at and below which the predetermined charge efficiency can be achieved, e.g. 30 degrees, and the width of the vehicle mark 91 is set such that the ground mark 57 thus turned can be within the vehicle mark 91. In this way, the width of the vehicle mark 91 corresponds to the range within which the predetermined charge efficiency can be achieved. Note that the vehicle mark 91 is larger than the ground mark 57 in FIG. 9, but the ground mark 57 may be larger.

As described above in detail, in the parking assistance device 300 according to this embodiment, the vehicle mark 91 has a width corresponding to the range within which the predetermined charge efficiency can be achieved. Thus, the driver can ensure the required predetermined charge efficiency by parking in such a way as to position the ground mark 57 within the vehicle mark 91.

Note that the above embodiments are examples of the present invention. Thus, the present invention is not limited to the above embodiments. Besides these embodiments, various changes can of course be made in accordance with designs and the like without departing from the technical idea of the present invention.

REFERENCE SIGNS LIST 1 vehicle
2 parking space
11 power control unit
12 ground coil
13 wireless communication unit
14 control unit
22 vehicle coil
23 wireless communication unit
24 charge control unit
25 rectification unit
26 relay unit
27 battery
28 inverter
29 motor
30 notification unit
51 camera
53 display unit
55 image control unit
57 ground mark
59, 91 vehicle mark
100 power supply device
110 AC power source
111 rectification unit
112 PFC circuit
113 inverter
200 power reception device
300 parking assistance device
L track prediction line

The invention claimed is:

1. A parking assistance device for providing parking assistance in parking a vehicle into a parking space with a ground coil placed at the parking space, the ground coil being configured to wirelessly supply power to a vehicle coil mounted on the vehicle, wherein
a ground mark indicating a coil axis direction of the ground coil and a position of the ground coil is placed at the parking space,
the parking assistance device comprises:
an imaging unit configured to capture an image of the parking space including the ground mark;
a display unit configured to display the image captured by the imaging unit; and
an image control unit configured to display a vehicle mark in the image displayed on the display unit, the vehicle mark indicating a coil axis direction of the vehicle coil and a position of the vehicle coil, wherein
the image control unit displays the vehicle mark in the image such that the vehicle mark and the ground mark are superimposed on each other when the vehicle on which the vehicle coil is mounted reaches a position and angle at which the vehicle is capable of being wirelessly charged.

2. The parking assistance device according to claim 1, wherein
the vehicle coil and the ground coil are solenoid type coils,
the ground mark has a shape of a line segment indicating the coil axis direction of the ground coil, and
the vehicle mark has a shape of a line segment indicating the coil axis direction of the vehicle coil.

3. The parking assistance device according to claim 2, wherein the vehicle mark has a width corresponding to a range within which a predetermined charge efficiency is capable of being achieved.

4. The parking assistance device according to claim 1, wherein the image control unit detects change in coil-to-coil distance between the ground coil and the vehicle coil from change in attitude of the vehicle on which the vehicle coil is mounted, and corrects a position and shape of the vehicle mark in accordance with the change in coil-to-coil distance.

5. The parking assistance device according to claim 1, wherein the image control unit displays a track prediction line on the image and changes the track prediction line in accordance with a steering angle of the vehicle on which the vehicle coil is mounted, the track prediction line predicting a track of the vehicle mark.

6. A parking assistance method in parking a vehicle into a parking space with a ground coil placed at the parking space, the ground coil being configured to wirelessly supply power to a vehicle coil mounted on the vehicle, comprising:
placing a ground mark at the parking space, the ground mark indicating a coil axis direction of the ground coil and a position of the ground coil;
capturing an image of the parking space including the ground mark by using an imaging unit;
displaying the image captured by the imaging unit on a display unit; and
performing an image control process that displays a vehicle mark in the image displayed on the display unit, the vehicle mark indicating a coil axis direction of the vehicle coil and a position of the vehicle coil, wherein the image control process displays the vehicle mark in the image such that the vehicle mark and the ground mark are superimposed on each other when the vehicle on which the vehicle coil is mounted reaches a position and angle at which the vehicle is capable of being wirelessly charged.

7. A parking assistance device for providing parking assistance in parking a vehicle into a parking space with a ground coil placed at the parking space, the ground coil being configured to wirelessly supply power to a vehicle coil mounted on the vehicle, wherein
a ground mark indicating a coil axis direction of the ground coil and a position of the ground coil is placed at the parking space,
the parking assistance device comprises:
an imaging unit configured to capture an image of the parking space including the ground mark;
a display unit configured to display the image captured by the imaging unit; and
an image control unit configured to display a vehicle mark in the image displayed on the display unit, the vehicle mark indicating a coil axis direction of the vehicle coil and a position of the vehicle coil,
wherein the image control unit displays the vehicle mark in the image such that the vehicle mark and the ground mark are superimposed on each other when the vehicle on which the vehicle coil is mounted reaches a position and angle at which the vehicle is capable of being wirelessly charged, and
wherein the vehicle coil and the ground coil are solenoid type coils, the ground mark has a shape of a line segment indicating the coil axis direction of the ground coil, and the vehicle mark has a shape of a line segment indicating the coil axis direction of the vehicle coil.

\* \* \* \* \*